United States Patent [19]

Wise

[11] 4,133,619

[45] Jan. 9, 1979

[54] EXTRUSION CASTING APPARATUS

[75] Inventor: Mark J. Wise, Brookville, Ohio

[73] Assignee: The Flexicore Co., Inc., Dayton, Ohio

[21] Appl. No.: 722,041

[22] Filed: Sep. 10, 1976

[51] Int. Cl.[2] .......... B29B 1/04; B28B 5/00; B28B 21/22

[52] U.S. Cl. .......... 425/64; 425/114; 425/432

[58] Field of Search .......... 425/262, 396, 208, 205, 425/449, 114, 376; 259/191, 3, 1 R

[56] References Cited

U.S. PATENT DOCUMENTS

| | | | |
|---|---|---|---|
| 3,074,107 | 1/1963 | Mase et al. | 425/114 |
| 3,159,897 | 12/1964 | Ellis et al. | 425/64 X |
| 3,164,375 | 1/1965 | Frenkel | 425/376 X |
| 3,176,371 | 4/1965 | Patchen | 425/262 X |
| 3,284,867 | 11/1966 | Booth | 425/114 |
| 3,292,227 | 12/1966 | Olds | 425/376 X |
| 3,602,950 | 8/1971 | Bielfeldt | 425/449 X |
| 3,781,154 | 12/1973 | Herbert | 425/64 X |
| 3,877,860 | 4/1975 | Putti | 425/64 X |

FOREIGN PATENT DOCUMENTS

| | | | |
|---|---|---|---|
| 665850 | 7/1963 | Canada | 425/64 |

*Primary Examiner*—Billy S. Taylor

*Attorney, Agent, or Firm*—Biebel, French & Nauman

[57] ABSTRACT

Apparatus for manufacturing precast, prestressed, hollow-core, concrete slabs, including an extruder which is movable along a fixed casting bed to extrude from a relatively dry concrete mix a slab having longitudinally extending hollow cores and grout keyways extending along the slab sides. Multiple, core-forming augers in the extruder are shaped and positioned with respect to a feed opening in the extruder in a manner which eliminates cavitations in the slab and provides smooth, well formed slab surfaces and proper bonding between the concrete and prestressing wires.

3 Claims, 14 Drawing Figures

FIG-7
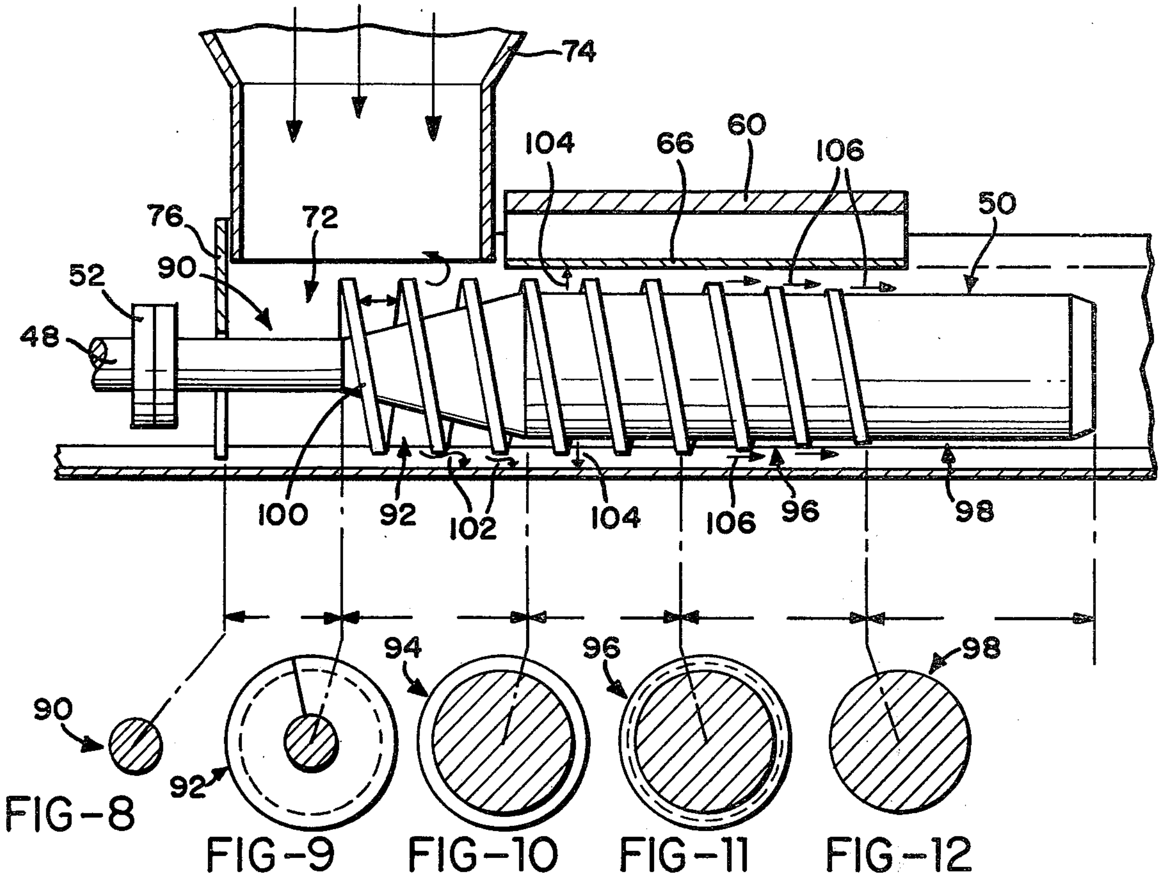
FIG-8 FIG-9 FIG-10 FIG-11 FIG-12
FIG-13
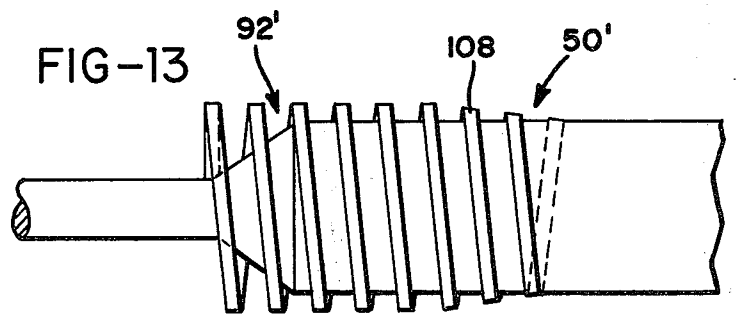
FIG-14
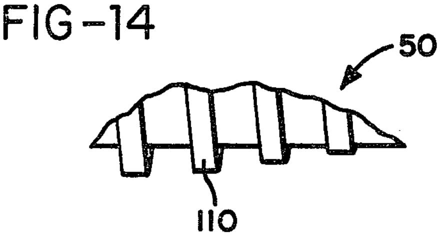

EXTRUSION CASTING APPARATUS

BACKGROUND OF THE INVENTION

The majority of precast, prestressed, hollow-core slabs are manufactured in either a wet casting process or by extrusion casting. In a typical wet casting process a concrete mix having a slump of from two inches to three inches is poured into a concrete slab form around inflatable, core-forming tubes and prestressing wires held in place in the form, the form vibrated and then placed in a kiln for curing of the concrete. While wet casting provides an excellent structural slab the equipment capital expense of a wet casting facility may be significantly greater than the cost of an extrusion casting line.

In an extrusion casting operation a relatively dry concrete mix is used because the hollow core slab must be essentially self-supporting immediately after extrusion. Therefore a dry mix with less than a one inch slump is generally used even though this is known to be a cause of many problems normally associated with extrusion casting.

For example, a concrete sufficiently dry to be immediately self-supporting may not feed consistently through the extruder, resulting in areas of reduced pressure, surface and internal cavities and inadequate bond between the concrete and prestressing steel.

Thus concrete in a relatively dry mix, even though vibrated, does not act as a true fluid with a continuous pressure throughout the confined area. Friction between particles and between the particles and confinement means results in rapid pressure transfer losses. As a result there may be a variance of pressure within the body of concrete.

Prior art extrusion apparatus usually places the core forming augers beneath the feed opening into the extruder with the outside diameters of the augers approximately the same as the inside diameter of the core in the finished slab. With this construction the turning augers hinder or otherwise restrict the flow of concrete onto the casting bed beneath the augers. Any concrete that falls into this area must do so through the openings between augers or by falling between flights of the augers as the augers turn.

This manner of filling the area beneath the augers often leaves a void resulting in cavitation and a variance of pressure in the mass of concrete. Aside from cavitation problems the variance of pressure along with a movement of the concrete in an attempt to equalize the pressure, will tend to displace reinforcing steel from the desired position within the apparatus.

Thus, despite the advantages of generally lower capital cost prior art extrusion casting systems are subject to the disadvantages of internal and surface cavitation problems, improper bonding of concrete to steel reinforcing and porous or otherwise undesirable surface finishes.

SUMMARY OF THE INVENTION

The present invention provides improved extrusion casting apparatus in which the shape of the core-forming augers and their relationship to the other components of the system are designed to provide a smooth surfaced slab free of internal and surface cavitation and with proper bonding between the concrete and reinforcing steel.

The augers may be considered as consisting of five separate sections, with a first section positioned beneath the downstream end of the extruder feed opening and of substantially smaller diameter than the diameter of the cores formed in the finished slab and free of flights or other projections which would tend to restrict or inhibit the flow of concrete through the extruder and onto the casting bed of the extrusion casting apparatus.

The second section is located immediately upstream of the first section and tapers outwardly in diameter in an upstream direction to a diameter approximately equal to the diameter of the cores in the completed slab. Beginning with the second section the augers include helical flights which project outwardly to an outside diameter larger than the diameter of the core in the slab but less than the distance between the center lines of two adjacent cores.

A third section located immediately upstream of the first two sections has a diameter approximately equal to the cores in the slab and helical flights with outside diameters substantially equal to the diameter of the flights in the second section.

In a fourth section immediately upstream of the third section the auger shaft diameter remains constant and approximately equal to the diameter of the shaft in the third section, but the flights at this point begin tapering in an upstream direction to a smaller diameter approximately equal to the diameter of the slab cores, at which point they disappear.

The last section immediately upstream of the fourth section consists only of the auger shaft of a constant diameter approximately equal to the slab cores.

The positions relative to the extruder of each of the sections of the augers also forms a part of the present invention. Briefly, the first section is located directly beneath the feed opening to the extruder, the second section is also located beneath a portion of the feed opening but adjacent an upstream side thereof, the third section is positioned upstream of the feed opening and beneath a top forming plate. The fourth section is positioned near the upstream end of the top forming plate and the fifth section projects upstream beyond the top forming plate.

With this configuration of the augers and their relationship to the other extruder components the improved operation of the extruding apparatus of the present invention is as follows: As concrete flows through the feed opening it can readily pass around the reduced diameter sections of the augers and the reinforcing steel and with relatively little restriction fall directly onto the casting bed.

The next section of the augers then comes into action with the flights which begin at this section boring into the concrete which has been deposited at the first section of the augers. This boring action fills the area between the auger flights, but should there be any voids remaining additional concrete is still available from the feed opening since this section of the auger is also located beneath a portion of the feed opening.

Because the second sections of the augers have an increasing shaft diameter which reduces the areas between the confines of the flights, as the concrete moves along the flights excess concrete results which must spill out. This results in movement of the concrete along the confines of the slab forming apparatus, i.e. the casting bed and movable side walls.

As is well known in the art of concrete finishing, the repeated movement of a steel surface over concrete results in bringing fine particles and moisture to the surface and provides a smooth surface. The reverse is, of course, also true, so that when the concrete spills out of the second sections of the augers it moves over the smooth surfaces of the casting bed and the movable side walls of the extruder and a smooth outer slab surface results.

Additionally, movement of the concrete in this manner also occurs around reinforcing steel positioned in the apparatus. This movement provides a wetting of the reinforcing steel with concrete fines and moisture and provides a strong structural bond between the reinforcing steel and concrete after the slab has cured.

In the third section of the augers the space between the top forming plate and the other confining sections of the machine is filed with concrete. As the augers turn additional concrete is led along the flights, compacting the concrete in all directions outwardly from the augers. This converts to a force against the casting bed and the confines of the extruder at this point and prevents continued circulation of the concrete as occured about the second section of the auger.

Because the flights in the fourth section of the augers taper inwardly in an upstream direction forces are generated and pressures occur over the entire lengths of the augers as they turn and move forward. This results in a force which propels the extruder along the casting bed. By gradually reducing the diameter of the flights in the fourth section in the upstream direction the possibility of ending the operation with the flights full of concrete that keeps turning with the auger is avoided, and instead the tapered flights are continually withdrawn from the concrete as they move downstream.

It should also be noted that by forming the augers with flights of a greater diameter than the diameter of the cores in the finished slab, there is a constant working of the concrete immediately outside of the surfaces of the cores, unlike prior art extruders wherein the maximum diameters of the flights are equal to the diameters of the cores in the finished slab.

The fifth and last section of the augers consists only of the shaft of the augers without flights and with the shaft at this point approximately the same diameter as the diameter of the cores in the slab to provide a final trowelling effect. In this regard the fifth section of the augers need not necessarily be round in cross section but of any convenient shape to impart a final finishing to the core surfaces.

From the above it will be seen that the present invention provides improved extrusion casting apparatus which, through augers of a particular configuration and the positional relationships between the sections of the augers and the remaining components of the apparatus, provides a hollow-core, structural slab free of many of the disadvantages normally associated with extrusion casting processes.

BRIEF DESCRIPTION OF THE DRAWINGS

FIG. 7 is a cross-sectional elevational view through the extrusion casting apparatus;

FIGS. 8 through 12 are removed cross-sectional views through an improved auger of the present invention;

FIG. 13 is a side view of a second preferred embodiment of the extruder auger; and FIG. 14 is an enlarged view of a portion of another preferred embodiment of auger.

DESCRIPTION OF THE PREFERRED EMBODIMENTS

Figure 6:
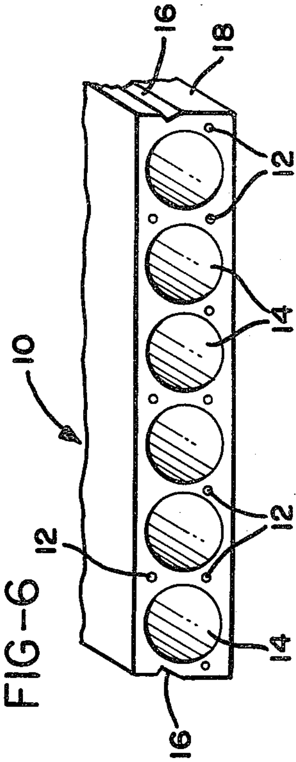
FIG. 6 is a partial perspective view of a prestressed, precast, hollow-core slab.

FIG. 6 of the drawings shows a portion of a typical hollow-core, precast, prestressed concrete slab 10 including prestressing reinforcing strands 12, a plurality of cores 14 extending longitudinally of the slab and grout keyways 16 formed in the opposite side 18 of the slab.

Figures 1, 2, 3:
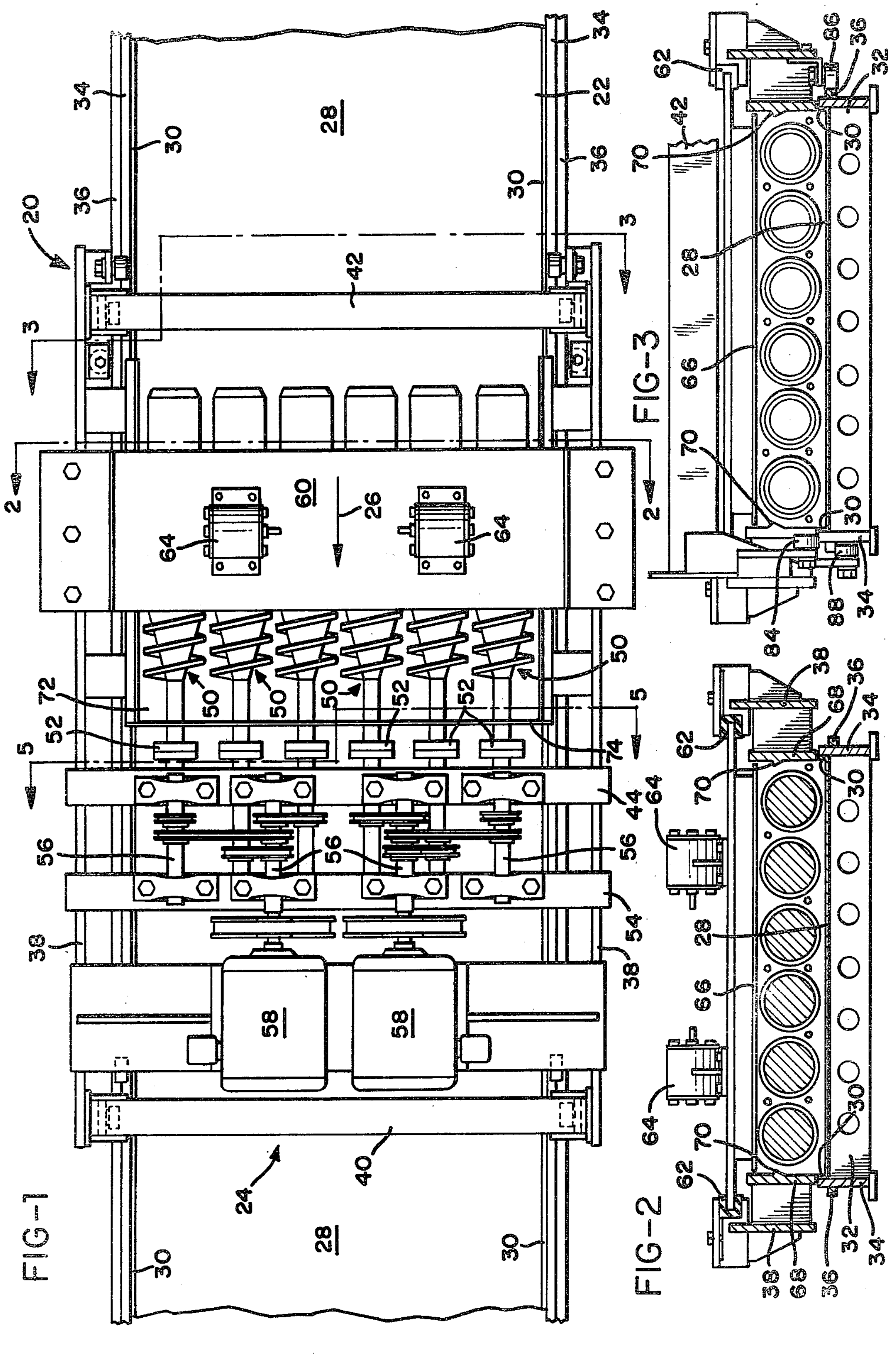
FIG. 1 is a top plan view of apparatus in accordance with the present invention.
FIG. 2 is a cross-sectional view taken substantially along lines 2—2 of FIG. 1.
FIG. 3 is a cross-sectional view taken substantially along line 3—3 of FIG. 1.
Figure 4:
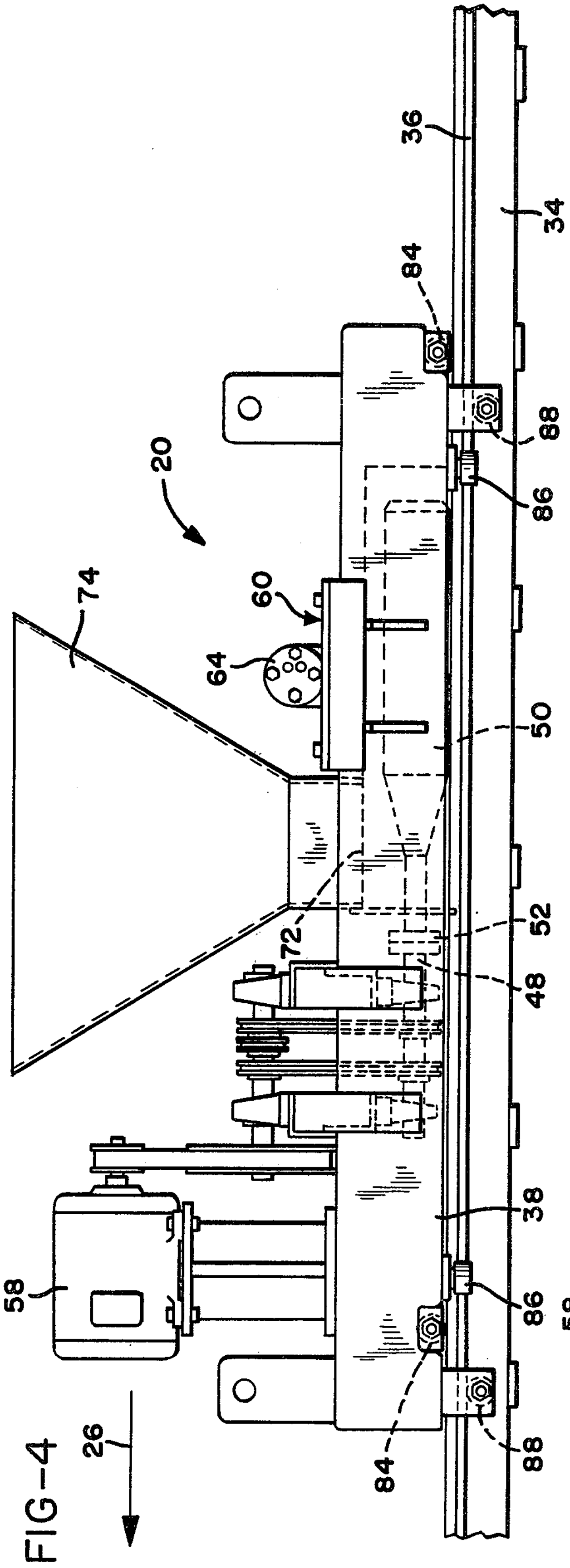
FIG. 4 is a side elevational view of the apparatus of FIG. 1.
Figure 5:
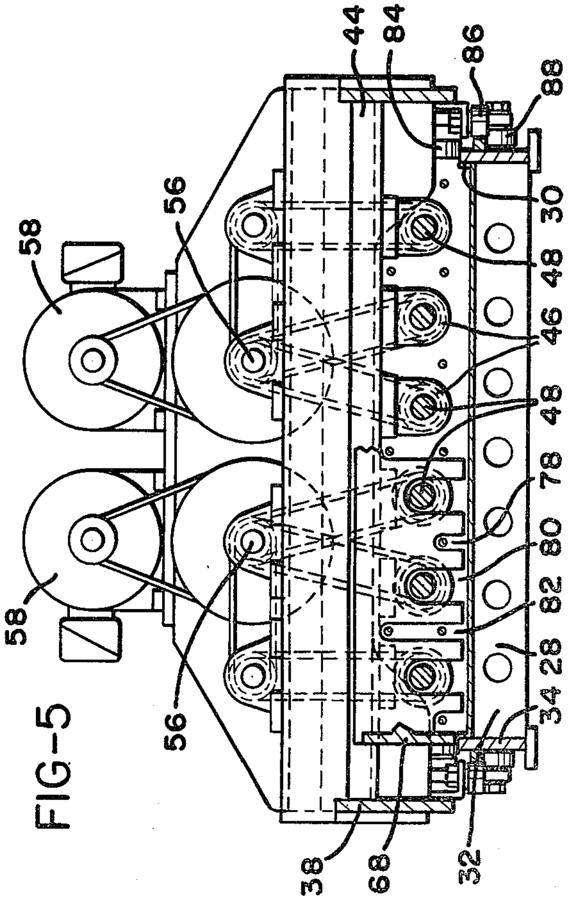
FIG. 5 is a cross-sectional view taken along line 5—5 of FIG. 1.

With reference initially to FIGS. 1 and 4 of the drawings it will be seen that extrusion casting apparatus 20 for casting a slab such as slab 10 includes a casting bed 22 and an extruder 24 movable along the bed in the downstream direction indicated by the arrow 26. The casting bed 22 (FIG. 1), includes, as best seen in FIGS. 2, 3 and 5 of the drawings, a bottom pan 28 having upturned edges 30 and supporting cross members 32 which extend between longitudinally extending side rails 34. Also mounted on the side rails 34 and projecting outwardly therefrom are trackways 36.

The extruder 24 includes a pair of structural members 38 extending longitudinally of the extruder and interconnected adjacent front and rear ends by cross members 40 and 42. An intermediate cross member 44, as best seen in FIGS. 1 and 5 of the drawings, carries, as seen in FIG. 5, bearings 46 which support in cantilever fashion downstream ends of shafts 48 of augers 50. Each shaft 48 may be connected to the main section of each auger by means of a coupling 52 of any convenient construction. Also mounted on the cross member 44 and a second cross member 54 are a plurality of shafts 56 which, through a belt and pulley arrangement transfer rotary power from engines or motors 58 to the augers 50.

Extending across the extruder is a top plate assembly 60 which is resiliently supported by means of mounts 62 on the structural members 38. Secured to the top of assembly 60 are vibrators 64 which may be of conventional construction. Top plate assembly 60 also carries a top plate 66 which, in the operation of the extrusion apparatus shapes the top surface of the slab. The extruder also carries a pair of side plates 68 which are each provided with inwardly projecting portions 70 that form the grout keyways 16 in the sides of the slab.

As can be best seen in FIGS. 1 and 4 of the drawings, feed opening 72 to the extruder is surrounded by a hopper or the like 74 and a plate 76, as best seen in FIGS. 4 and 5 of the drawings, extends across the extruder adjacent the forward edge of the feed opening and has relieved sections 78, 80 and 82 to accommodate the reenforcing strands 12 and the portions of the augers extending through this section of the extruder. The entire structure thus described is movable along the side rails 34 by means of rollers 84, rollers 86 which engage the outer surfaces of the trackways 36 and the rollers 88 which engage the bottom surfaces of the trackways.

As best seen in FIG. 7 of the drawings, the augers 50 each consist of a first section 90, a second section 92, a third section 94, a fourth section 96 and a fifth and last section 98. Section 90, as also seen in FIG. 8 of the drawings, consists of a shaft portion only of the auger and it is of substantially smaller diameter than any other section of the auger. Section 92, as also shown in FIG. 9, increases in diameter from the diameter of the section 90 to that of the following section 94 and is also provided with flights 100 which have a maximum diameter at this point.

Section 94, as seen in FIGS. 7 and 10, is of substantially constant diameter and of the same diameter as the cores formed in the completed slab, while the diameter of the flights is of substantially the same diameter as the flights in the section 92. In section 96, FIGS. 7 and 11, the diameter of the auger shaft remains unchanged but the diameter of the flights diminishes in an upstream direction until, in section 98, they disappear. Section 98, as shown in FIGS. 7 and 12, consists of a shaft portion only of the auger of constant diameter substantially equal to the diameter of the cores 14 which imparts a final trowelling effect to the inside surfaces of the cores 14.

In operation the extruder 24 is positioned adjacent one end of the casting bed 22. As is conventional, the augers may be positioned protruding through holes in a bulkhead of approximately the same cross section as that of the finished slab. With the engines 58 rotating the augers 50, a relatively dry concrete mix, preferably having a slump of one inch or less, is dumped into the feed opening 72 of the extruder and moves around the relatively small diameter sections 90 of the augers and reenforcing steel (not shown) positioned over the casting bed and falls directly onto the pan 28 of the casting bed. The bulkhead acts as a starter plate and thereafter the augers push on prior extruded concrete.

Additional concrete falls onto section 92 of the augers and insures that as they bore forward into the concrete deposited at section 90 the flights are maintained full and an excess is provided which can spill over, as indicated by the arrows 102 in FIG. 7, to insure wetting of the reenforcing strands, a lack of internal cavitation and a trowelling of the concrete along the pan surface 28 and the surfaces of the side plates 68. The front edges of the flights also act as rotating "fingers" and agitate the concrete further, moving it over the pan and about the reenforcing strands.

As concrete is continually fed into the opening 72 and carried back by the augers the resultant force causes the concrete to move radially outwardly of the augers in the directions indicated by the arrows 104 as well as outwardly against the side plates 68. At the same time the vibrators 64 cause the assembly 60 and its top plate 68 to vibrate and trowel the top surface of the slab. Continued concrete feeding and rotation of the augers carries the concrete back to build up a back pressure as indicated by the arrows 106, which results in the extruder being driven forward along the casting bed, leaving behind a self-supporting, hollow cored slab.

Thus, the concrete is compacted under pressure and vibration, resulting in a dense, smooth concrete while also aiding bonding to the strands, reducing friction between the augers and side rails and aiding flow from the hopper.

FIG. 13 shows a second embodiment 50' of an auger which is the same in many respects as the augers 50 except that in the section 92' thereof the diameter of the shaft portion of the auger has a much steeper taper and a portion of the outer periphery 108 of the flights is angularly inwardly disposed in an upstream direction with respect to the longitudinal axis of the auger. This is in contrast to the construction shown in FIGS. 7 and 14 of the drawings wherein the outer periphery 110 of the flights extends substantially parallel to the longitudinal axis of the auger.

While the forms of apparatus herein described constitute preferred embodiments of the invention, it is to be understood that the invention is not limited to these precise forms of apparatus, and that changes may be made therein without departing from the scope of the invention.

What is claimed is:

1. In extrusion casting apparatus for casting an elongated slab having hollow cores extending longitudinally thereof on a substantially smooth flat casting bed using a concrete mix of sufficient dryness to be self-supporting immediately upon extrusion of said slab, including an extruder movable along and over said bed from adjacent an upstream end thereof to adjacent a downstream end thereof and having multiple rotatable augers each consisting of a one-piece shaft and a flight helically encircling part of said shaft, and a feed opening for depositing relatively dry concrete mix through said extruder onto said bed, the improvement comprising:

said one-piece shafts tapering from a minimum diameter portion beneath said feed opening to a maximum diameter portion adjacent their upstream ends substantially equal to the diameter of the hollow cores formed in said slab, at least part of said minimum diameter portion of said shafts being substantially smooth and free of said flights whereby said relatively dry concrete mix deposited in said extruder can move relatively unimpeded around and beneath said smooth portions of said shafts and onto said bed, each of said flights having a maximum diameter portion greater in diameter than said maximum diameter of said shafts and a minimum diameter portion substantially equal to said maximum diameter portion of said shafts, and said flights tapering in an upstream direction from said maximum diameter portions thereof disposed beneath said feed opening to said minimum diameter portions merging with said maximum diameter portions of said shafts.

2. The apparatus of claim 1 wherein:

the outer periphery of said flights extends substantially parallel to the longitudinal axis of said auger.

3. The apparatus of claim 1 wherein:

the outer periphery of said flights is angularly disposed inwardly in an upstream direction with respect to the longitudinal axis of said auger.

* * * * *